(12) United States Patent
Markin

(10) Patent No.: US 8,896,483 B2
(45) Date of Patent: Nov. 25, 2014

(54) METHOD OF AUTOMATIC TARGET ANGLE TRACKING BY MONOPULSE RADAR UNDER CONDITIONS OF INTERFERENCE DISTORTING LOCATION CHARACTERISTIC

(76) Inventor: Evgeny Markin, Moscow (RU)

( * ) Notice: Subject to any disclaimer, the term of this patent is extended or adjusted under 35 U.S.C. 154(b) by 61 days.

(21) Appl. No.: 12/837,461

(22) Filed: Jul. 15, 2010

(65) Prior Publication Data

US 2012/0013500 A1    Jan. 19, 2012

(51) Int. Cl.
G01S 13/00    (2006.01)
G01S 3/08    (2006.01)
G01S 3/32    (2006.01)
H01Q 25/02    (2006.01)

(52) U.S. Cl.
CPC . *G01S 3/08* (2013.01); *G01S 3/325* (2013.01); *H01Q 25/02* (2013.01)
USPC .......................................... 342/149; 342/155

(58) Field of Classification Search
USPC ................................. 342/149, 155
See application file for complete search history.

(56) References Cited

U.S. PATENT DOCUMENTS 7,250,902 B2 *    7/2007    Manoogian et al. .......... 342/154

OTHER PUBLICATIONS

E. Markin, On interference immunity of angle tracking systems under conditions of interference distorting location characteristic, Radar Conference, 2009 IEEE May 4-8, 2009 pp. 1-6, Pasadena, USA, Digital Object Identifier 10.1109/RADAR.2009.4977092.*

E. Markin, Jamming detection in providing for radar jamming immunity, EUROCON'09 IEEE, May 18-23, 2009, pp. 1565-1567, Saint Petersburg, Russia, Digital Object Identifier 10.1109/EUROCON.2009.5167849.*

E. Markin, Method of automatic target angle tracking by sum- and-difference monopulse radar invariant against the polarization jamming. Intellcom LLC, Moscow, Russian Federation. Europwean Microwave Week 2010, CNIT La Defense, Paris, France, Sep. 26-Oct. 1, 2010. Conference Program, p. 75: Sep. 30, 2010, EuRAD Poster05-6.*

* cited by examiner

*Primary Examiner* — Timothy A Brainard

(57) ABSTRACT

Method of automatic target angle tracking by sum-and-difference monopulse radar covers radiolocation sphere and specifically monopulse direction finding systems. It can be used in order to increase guidance accuracy, for example, for anti aircraft missiles and of unmanned aerial vehicles to radar targets such as: radio beacons; aerial vehicles reflecting the radio signal that illuminates them; aerial vehicles and ground-based devices radiating radio signals and jamming signals. The aim of the method consists in the assurance of reliability and stability and in the enhancement of guidance accuracy of automatic target angle tracking due to elimination of automatic tracking losses and great errors arising during the influence of the signals of orthogonal polarization or polarization close to it.

The proposed method provides full protection from polarization jamming for all types of monopulse radars.

7 Claims, 10 Drawing Sheets

METHOD OF AUTOMATIC TARGET ANGLE TRACKING BY MONOPULSE RADAR UNDER CONDITIONS OF INTERFERENCE DISTORTING LOCATION CHARACTERISTIC

The invention relates generally to radiolocation sphere, and particularly to monopulse direction finding systems. It can be used to increase guidance accuracy, for example, of unmanned aerial vehicles to radar targets such as: radio beacons; aerial vehicles reflecting the radio signal that illuminates them; aerial vehicles and ground-based devices radiating radio signals and jamming signals.

It is commonly known that the presence of antenna cross-polarization radiation leads to reduction of direction finding accuracy; it can result in the complete failing of the monopulse direction finding system, i.e. automatic tracking loss [1] (Chapters 6, 8), [2]. The said phenomenon occurs during direction finding of the targets with marked depolarization effect which is the majority of real aerodynamic targets possess. But this problem is most important when so-called polarization interference is used as electronic countermeasures means [1] (paragraph 8.5.2), [2], [3].

A method of target angle tracking by the sum-and-difference monopulse radio direction-finder is known, in which reception of signals from the target in the sum and difference channels on two orthogonal (cross) polarizations is used to decrease tracking errors (See [1], p. 249). The described direction-finders possess possibility to operate on the group of reception channels that have polarization most closely coinciding with the one of the reception channels.

However, the drawback of the above mentioned method is the necessity of doubling in the number of monopulse direction-finder reception channels (six instead of three), that makes this method virtually unacceptable for usage in, for example, the air-borne equipment of aerial vehicles including unmanned aerial vehicles (UAV) and the like due to weight, and size restrictions.

A method of target angle tracking is known, that is the closest to the claimed one herein, which is based on the use of polarization filtering of electromagnetic waves coming from the target in the sum-and-difference monopulse radio direction-finder (See [1], p. 69-71, p. 168-169). In this case polarization filtering is performed with the help of the polarization array mounted in the monopulse antenna mouth that allows to weaken an adverse effect of signals on cross polarization on the target direction finding accuracy.

However the presence of diffraction effect on the edges of the polarization array doesn't allow to get a cross polarization level less than minus 35 dB (See [1], p. 165-169) with the help of polarization filtering which is insufficient to protect from modern polarization interference jammers that create interference exceeding the signal by 40 dB and more (See [1], p. 224). Besides that this mode is often inefficient when the monopulse direction-finder antenna is located under the blister (for example, an airplane or an unmanned aerial vehicle). The blister owing to the curvilinearity of its surface considerably (up to minus 30-minus 15 dB) increases the cross polarization level of the receiving antenna with a polarization filter that heightens the susceptibility of the direction-finder to the influence of polarization interference and leads to the degradation of target tracking accuracy (See [1], p. 158, see also [3]).

The stability analysis of the angle tracking of the polarization interference source by the monopulse direction-finder is published in the transactions of the Radar Conference IEEE 2009[4]. The tracking loss problem was brought to Lyapunov's problem about the solution stability of a differential equation system. In this work it was shown that the influence of polarization interference leads to negative definiteness of the first derivative of the direction-finding characteristic that results in the shift of the eigenvalue spectrum matrix of the differential equation system factors describing the automatic control system under study in the right half-plane that in its turn leads to the instability of the automatic tracking system and in general case—to the automatic angle tracking loss. In this work it was also shown that it is impossible to form the optimal control function according to Bellman during the operation of the angular gauge by the polarization interference source beyond the system. Furthermore, in [4] in the state space of the automatic control system under study was carried out the synthesis of the solution which was optimal regarding the automatic tracking accuracy of the polarization interference jammer and it was shown the existence and uniqueness of the derived solution which corresponded to the inverse function from the function of error signal on the condition of the detection of the polarization interference influence on the monopulse direction-finder.

The fact of the detection of the polarization interference influence on the monopulse direction-finder is established by the polarization interference detector [5]. The polarization interference detector in the case under consideration is an additional receiving channel of the signals on the orthogonal polarization, the output of which with the output of the sum channel is supplied through detectors to the comparator from the output of which, in the case of the detection of the polarization interference influence, a signal of logical unit exists and it is a control signal. This is nothing other than a polarization interference detector with a single-bit analog-to-digital converter (See [4]).

The solution derived in [4] provides a good coincidence with the direction-finding characteristic of the monopulse direction-finder on the working polarization on the section approximately 0.4 . . . 0.6 of its half-width taken as a unit (See FIG. 10) and a continuous tracking of the polarization interference source with minimum errors (See FIG. 4, line 43).

SUMMARY OF THE INVENTION

Thus, the aim and the main technical result of the present invention is to ensure stability of automatic angle tracking on target.

The set aim is achieved by the following special features:
the reception of the signals from the target is carried out by a monopulse antenna by using sum and difference channels and the monopulse antenna has a vertical working polarization;
the difference signal amplitude and the phase difference between the signals of the sum and difference channels are measured, herewith the difference signal amplitude determines a value of an angular error signal, and the phase difference between the signals of the sum and difference channels determines a sign of the angular error signal;
the monopulse antenna is orientated in the direction of the target relying on the measured values of the amplitude and the phase difference signals corresponding to an angular error value and its sign;
an additional reception of signal component from the target on the polarization orthogonal or is close to orthogonal relative to the working polarization of said monopulse antenna, is performed;
the amplitude values of the additional and sum signals are compared;

when the amplitude value of the additional channel signal exceeds the amplitude value of the sum signal, the monopulse antenna is oriented relying on the angular error, the sign of which corresponds to the measured value of the phase difference between the sum and difference signals, the value is formed via the inverse transformation of the measured amplitude value of the difference signal.

The essence of the invention consists in the assurance of reliability and stability and in the enhancement of guidance accuracy of automatic target angle tracking due to elimination of automatic tracking losses and great errors arising during the influence of the signals of orthogonal polarization or polarization close to it.

The claimed method is illustrated via devices realizing thereof.

Figure 1:
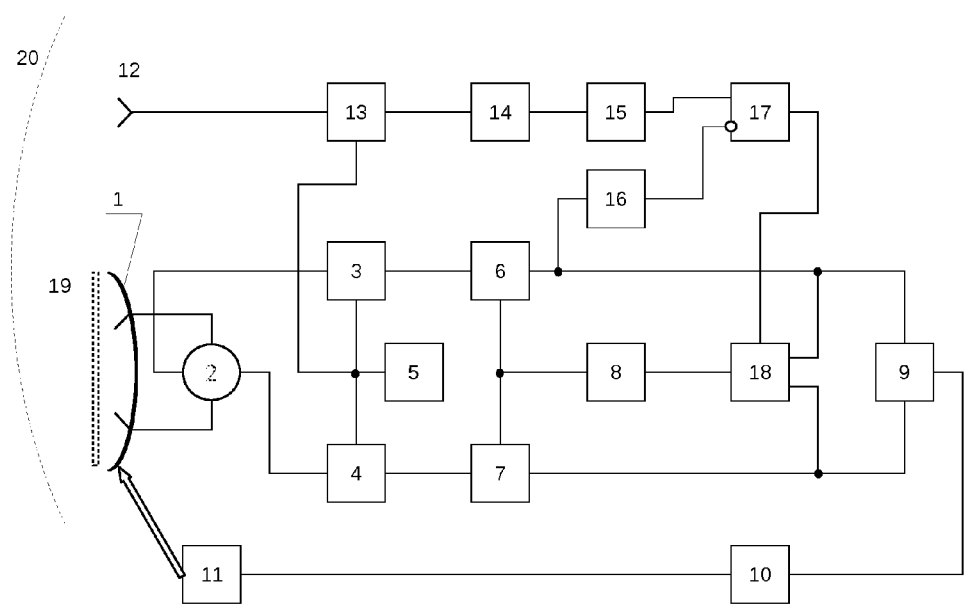
FIG. 1 gives the overview of the first variant of the flow diagram of the sum-and-difference monopulse radio direction-finder (monopulse radar) with the components which realize the claimed method.

The antennas directional patterns were calculated in the azimuth plane in the range of angles $\phi \in [-90; +90]$ degrees at a zero tilt angle ($\theta=0$ degrees).

In the figures and in the text the following designations are used:

1—Monopulse antenna
2—Stripline ring
3—Mixer of the sum channel
4—Mixer of the difference channel
5—Heterodyne
6, 7—Intermediate-frequency amplifiers of the sum and difference channels
8—Automatic gain control system of the sum channel
9—Phase detector
10—Error-signal amplifier
11—Monopulse antenna drive (mechanism)
12—Horn antenna (antenna of the additional channel)
13—Mixer of the additional channel
14—Intermediate-frequency amplifier of the additional channel
15, 16—Detectors of the additional and sum channels
17—Compare facility (comparator)
18—Switching device (switch)
19—Polarization filter
20—Radome
21—Analog-to-digital converter
22—Arithmetic unit
23—Digital-to-analog converter
24—$F_\Sigma^p(\phi)$—calculated directional pattern of the monopulse antenna 1 of the sum channel on the working polarization in the azimuth plane.
25—$F_\Sigma^k(\phi)$—calculated directional pattern of the monopulse antenna 1 of the sum channel on the cross polarization in the azimuth plane.
26—$F_{add}^p(\phi)$—calculated directional pattern of the horn antenna 12 of the additional channel on the working polarization in the azimuth plane.
27—$F_{add}^k(\phi)$—calculated directional pattern of the horn antenna 12 of the additional channel on the cross polarization in the azimuth plane.
28, 29—$F_{add}^k(\phi)$ and $F_\Sigma^p(\phi)$—calculated direction patterns of the system "monopulse antenna—horn antenna" at the outputs of devices 15 and 16 respectively during operation by the target signal on the working polarization of the monopulse antenna 1 in the azimuth plane.
30, 31—$F_{add}^p(\phi)$ and $F_\Sigma^k(\phi)$—calculated direction patterns of the system "monopulse antenna—horn antenna" at the outputs of devices 15 and 16 respectively during operation by the target signal on the cross polarization of the monopulse antenna 1 in the azimuth plane.
32, 33—$U_\Sigma(\phi, \alpha, t)$ and $U_{add}(\phi, \alpha, t)$—calculated functions of the signals at the outputs of devices 16 and 15 respectively during rotation of the target signal polarization plane with a certain constant angular velocity Ω in the basis of the receiving antenna 1 in the azimuth plane ($\dot\alpha=\Omega=$const).
34—$U_{com}(\phi, \alpha, t)$—control signal at the output of comparator 17 (output of comparator).
35—$U_{co}(\phi, \alpha, t)$—calculated function of the error signal at the input of error-signal amplifier 10 prototype.
36—$U_m(\phi, \alpha, t)$—calculated function of the error signal at the input of error-signal amplifier 10 during application of the claimed method.

37—α(t)—rated dependence of the inclination angle of the target signal polarization plane relative to the vertical line in the receiving basis of the monopulse antenna 1.

38—α(t)—experimental dependence of the inclination angle of the target signal polarization plane relative to the vertical line in the receiving basis of the monopulse antenna 1.

39—$U_\Sigma(\phi, \alpha, t)$—experimental dependence of the sum channel voltage amplitude at the output of device 16.

40—$U_{add}(\phi, \alpha, t)$—voltage of the additional channel at the output of device 15.

41—$U_{com}(\phi, \alpha, t)$—control voltage (control signal) at the output of comparator 17.

42—$U_{co}(\phi, \alpha, t)$—experimental time dependence of the prototype tracking error value.

43—$U_m(\phi, \alpha, t)$—experimental time dependence of the tracking error value for the claimed method.

DETAILED DESCRIPTION OF THE INVENTION

Example 1

The radio direction-finder (FIG. 1) comprises monopulse antenna 1 (for example, a paraboloid of revolution with two-mode feed) in the mouth of which is mounted a polarization filter 19. The working polarization for antenna 1 is a vertical one. The outputs of antenna 1 are connected to the sum-and-difference device in the form of stripline ring 2, the sum output of which is connected to mixer 3 and the difference output—to mixer 4. Mixers 3 and 4 are also connected to heterodyne 5 which is also connected to mixer 13. The signal input of mixer 13 is connected to horn antenna 12 having the horizontal working polarization (orthogonal relative to the working polarization of monopulse antenna 1), which is mounted on the edge of antenna 1. The output of the mixer 13 is connected to the input of the intermediate-frequency amplifier of the additional channel 14. The outputs of mixers 3 and 4 are connected respectively to the inputs of intermediate-frequency amplifiers 6 and 7, the outputs of which are connected to the appropriate inputs of phase detector 9, the output of which through error-signal amplifier 10 is connected to drive mechanism 11 of antenna 1 with polarization filter 19 that is located under radome 20 and that has, for example, an ogival form. Intermediate-frequency amplifiers 6 and 14 are connected through detectors 15 and 16 to the appropriate inputs of comparator 17, the output of which is connected to the driving point (control input) of switching device 18. The outputs of intermediate-frequency amplifiers 6 and 7 are also connected to the appropriate inputs of switch 18 the output of which is connected through automatic gain control system 8 with intermediate-frequency amplifiers 6 and 7.

Realization of Units 1-16, 19 is Described in the Book [1] (Chapters 2, 3, 7).

Figure 11:
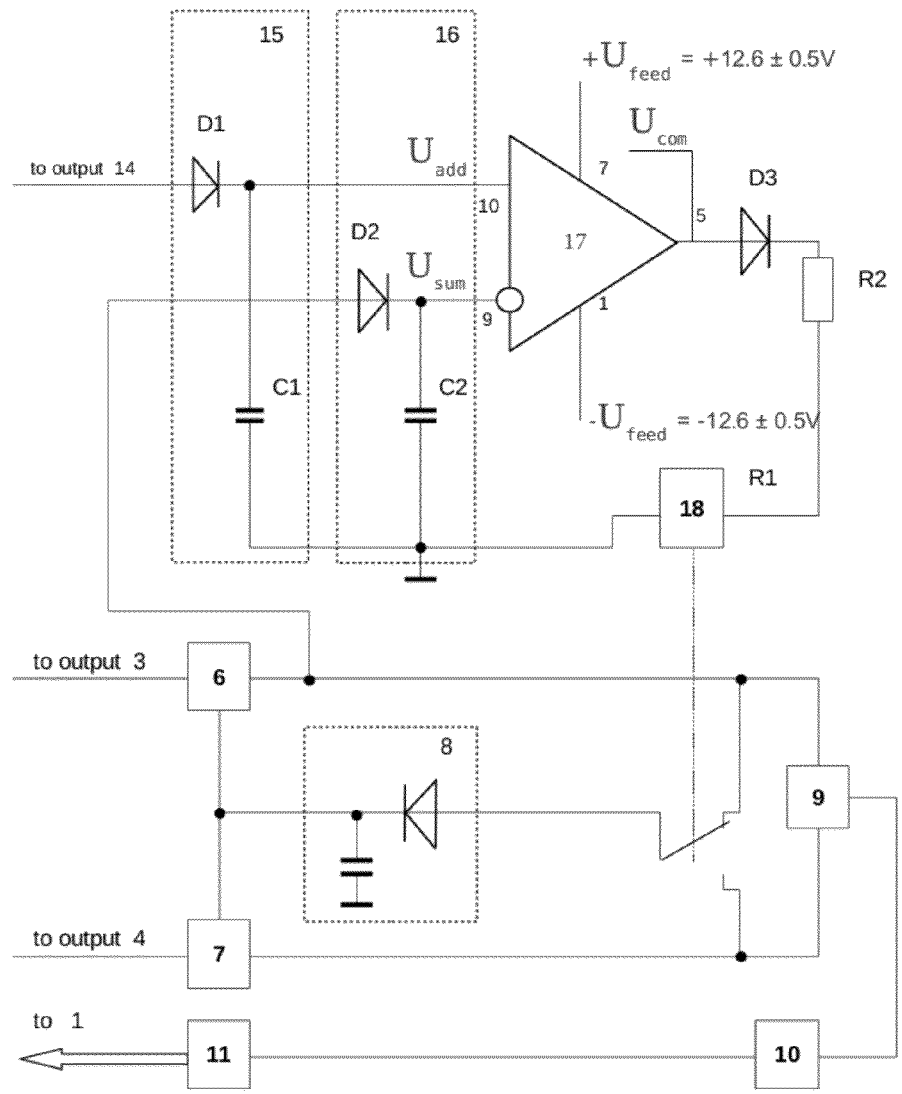
FIG. 11 depicts the first variant of the diagram of the devices which realize the claimed method and provide an experimental check of its proper performance.

Realization of devices 15, 16, 17, 18 is shown in FIG. 11. Signal detection of the additional and sum channels in devices 15 and 16 is carried out through diodes D1 and D2 respectively. Comparator 17 is assembled on microcircuit K140UD2A (CA3047T) with bipolar feed voltage $U_{feed}=\pm 12.6\pm 0.5V$. Radio electronic relay R1 is used as switching device 18 with operating voltage in the range [9V ... 12V], operating current 50 mA and operating time 11 ms.

It is necessary to mention that in order to decrease operating time any type of electronic switches on the basis of transistors, thyristors, dynistors or microcircuits instead of the relay can be used.

A device realizing the claimed method operates as follows.

Figure 4:
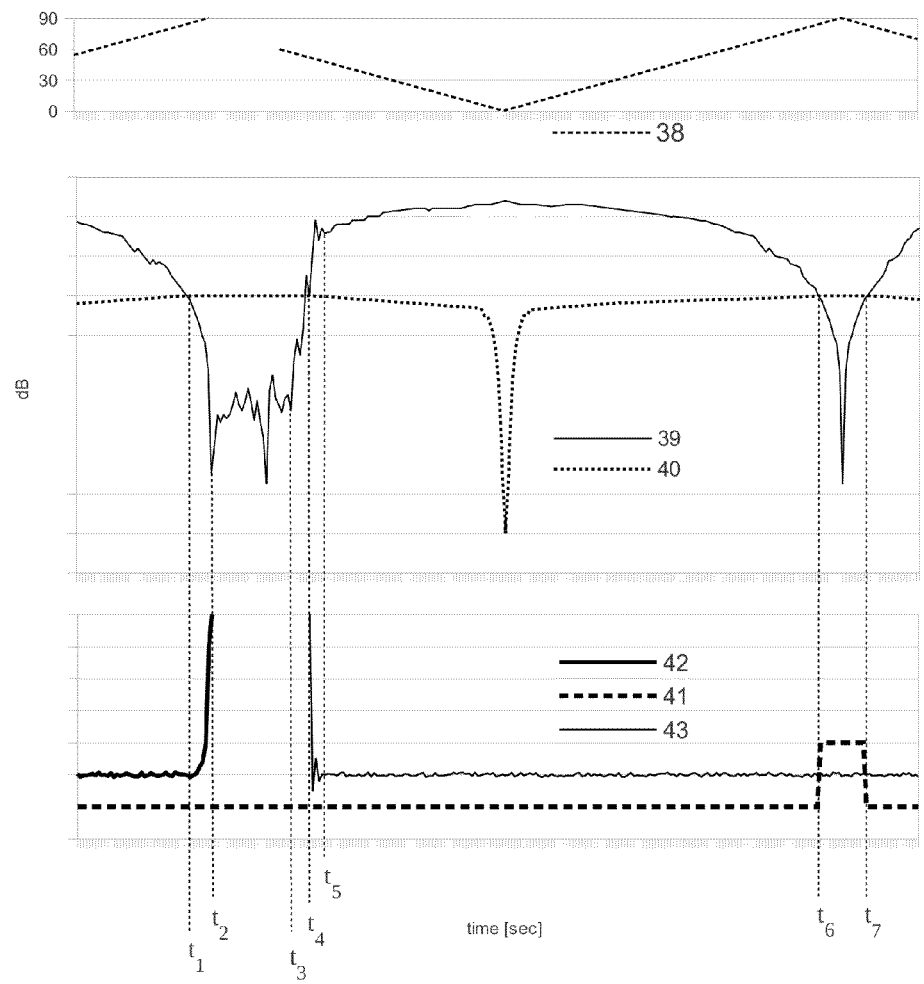
FIG. 4 shows experimental time diagrams which illustrate the radio direction-finder principle of operation in the prototype mode and with application of the claimed method.
Figure 5:
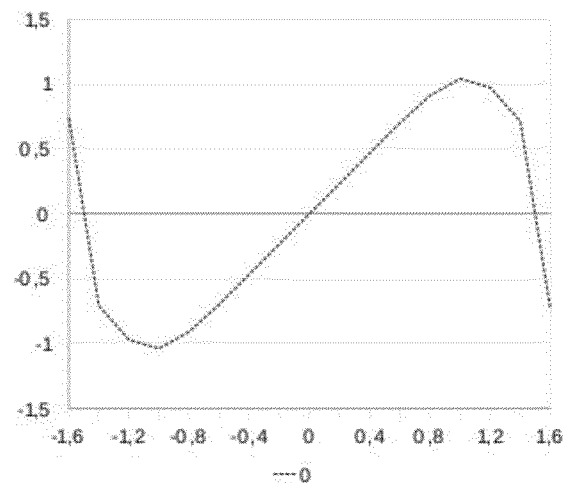
FIG. 5 shows the direction-finding characteristic on the working polarization at the zero inclination angle of the signal polarization plane α.
Figure 6:
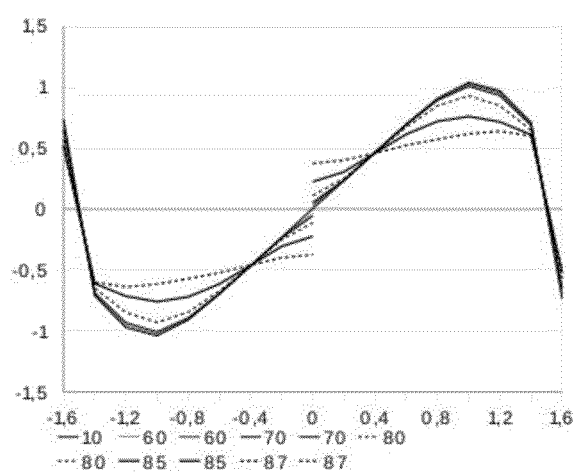
FIG. 6 depicts the direction-finding characteristics for inclination angles of the polarization plane α=10; 60; 70; 80; 85; 87 degrees.
Figure 7:
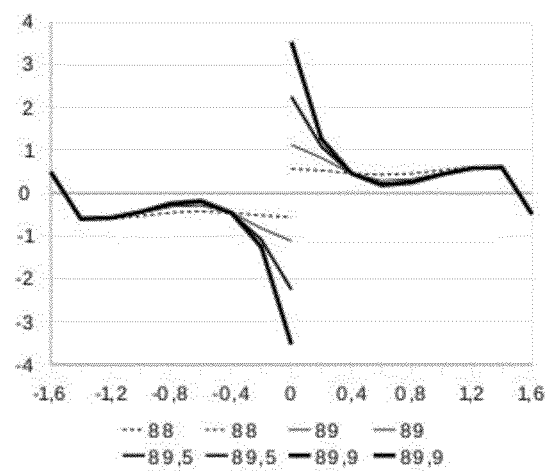
FIG. 7 depicts the direction-finding characteristics for inclination angles of the polarization plane α=88; 89; 89.5; 89.9 degrees.
Figure 8:
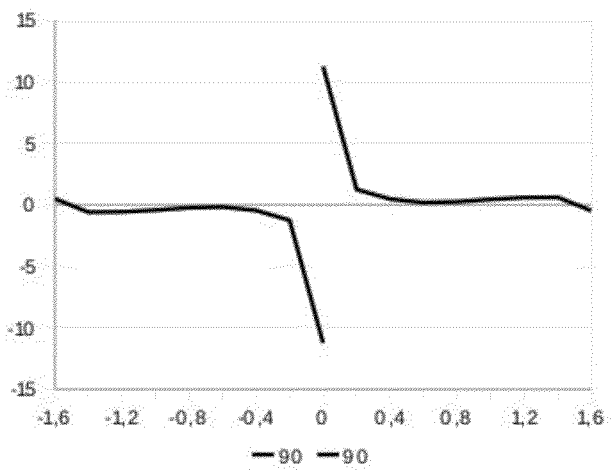
FIG. 8 shows the direction-finding characteristic on the cross polarization at α=90 degrees.
Figure 9:
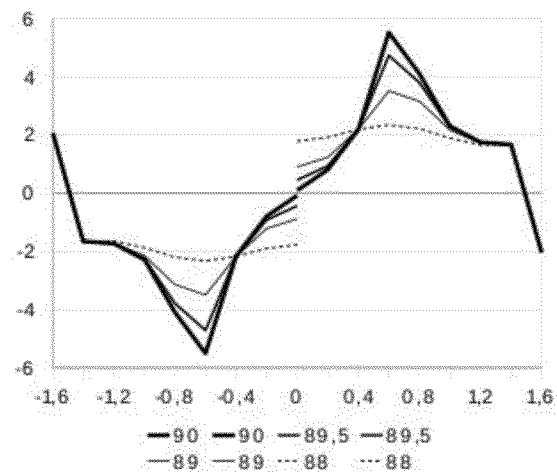
FIG. 9 depicts inverse unstandardized direction-finding characteristics for inclination angles of the polarization plane α=90; 89.5; 89; 88 degrees.

Let radio direction-finder track the target the signal polarization of which changes in time from the agreed polarization up to the orthogonal one in accordance with line 38 shown in FIG. 4, where α is the inclination angle of the target signal polarization vector relative to the vertical line—the ordinate of the diagram, time is laid along the abscissa axis. The real changes of the signal polarization can be caused by the polarization interference jamming or by the fluctuations of the signal reflected from the target. This signal after passing through the radome 20 and polarization filter 19 is received by monopulse antenna 1 having the vertical working polarization. Polarization filter 19 can be in the form of a set of thin conductors located in the monopulse antenna 1 mouth and oriented orthogonally to its working polarization which provide the reception of vertical polarization signals without attenuation and the reception of orthogonally polarized signals with certain attenuation. The signals from the outputs of monopulse antenna 1 come to the inputs of stripline ring 2 providing at its outputs the shaping of microwave signals of the sum and difference channels the signals of which come to mixers 3 and 4 respectively where they are transformed with the help of heterodyne 5 into the signals of intermediate frequency, which then are amplified in intermediate-frequency amplifiers 6 and 7 up to the required value and come to the inputs of phase detector 9. The difference signal amplitude determines the value of the angular error signal at the output of phase detector 9, the phase difference at the inputs of phase detector 9 between the signals of the sum and difference channels determines the sign of the angular error signal $U_{co}(\phi, \alpha, t)$ at the output 9 where φ is the angular error (displacement angle between a true direction on target and radar boresight of the monopulse direction-finder), α is the inclination angle of the target signal polarization vector relative to the working polarization vector of the monopulse antenna, and t is a time. Automatic gain control system 8 excludes the dependence of the angular error signal amplitude at the output of phase detector 9 on the level of the received signals by the connection of the input of automatic gain control system 8 through normally closed contacts of switching device 18 to the output of intermediate-frequency amplifier 6 of the sum channel, in this case the signal at the output of automatic gain control system 8 makes a simultaneous adjustment of the amplification coefficients of intermediate-frequency amplifiers 6 and 7 providing the signal normalization of the difference channel with the help of the sum one.

At the same time the reception of the signal component on the horizontal polarization by the additional channel of the direction-finder is performed with the help of horn antenna 12, mixer 13 and intermediate-frequency amplifier 14.

Figure 2:
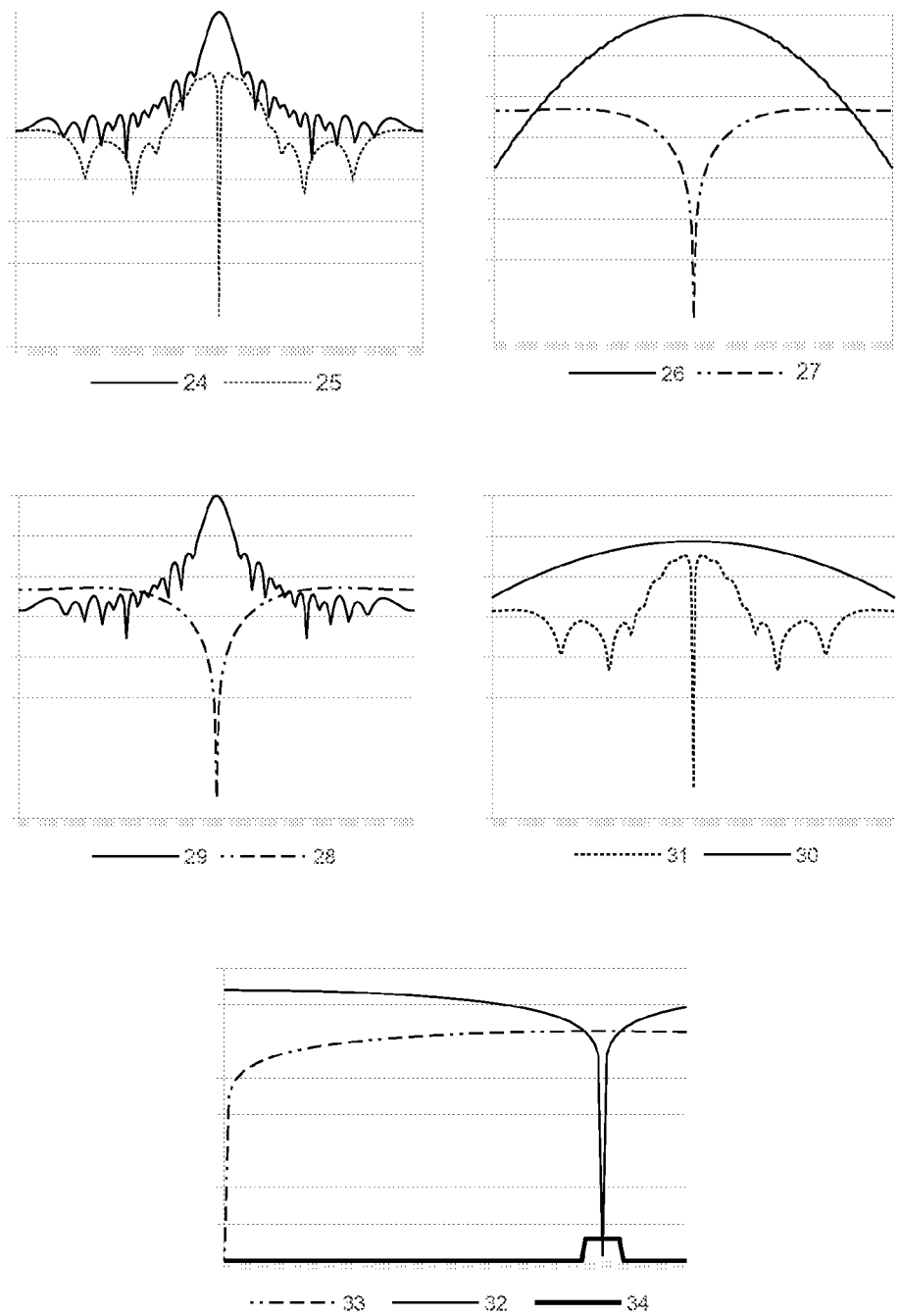
FIG. 2 shows the calculated directional patterns of the monopulse antenna, the antenna of the secondary (additional) channel and the system "monopulse antenna—antenna of the additional channel" on the working and cross polarization. Besides, in FIG. 2 are shown time dependences of the voltages on the outputs of the sum and additional channels during the ramp of angle α—the inclination angle of the signal polarization plane in the receiving basis of the monopulse antenna with a certain constant angular velocity Ω providing the unambiguous loss of the signal source (target) automatic angle tracking by the prototype.

Time dependences of the voltages on the outputs of the sum channel $U_\Sigma(\phi, \alpha, t)$ and additional channel $U_{add}(\phi, \alpha, t)$ are shown in FIG. 2 with curves 32 and 33 respectively. Voltage of automatic gain control system in dB (sum channel) is show in FIG. 4 by curve 39 and the signal of the additional channel—by line 40.

Voltage $U_{com}(\phi, \alpha, t)$ at the output of comparator 17 (FIG. 2 line 34) will be equal to $+U_{feed}$, when $U_{add}(\phi, \alpha, t) > U_\Sigma(\phi, \alpha, t)$ and will be equal to $-U_{feed}$ when $U_{add}(\phi, \alpha, t) \leq U_\Sigma(\phi, \alpha, t)$:

$$U_{com}(\varphi, \alpha, t) = \begin{cases} +U_{feed}, & \text{when } U_{add}(\varphi, \alpha, t) > U_\Sigma(\varphi, \alpha, t) \\ -U_{feed}, & \text{when } U_{add}(\varphi, \alpha, t) \leq U_\Sigma(\varphi, \alpha, t) \end{cases}$$

If the leg 1 of microcircuit K140UD2A is grounded the necessity in diode D3 disappears. The voltage at the output of comparison (comparator) circuit 17 is show in FIG. 4 by line 41 and is written in the following form:

$$U_{com}(\varphi, \alpha, t) = \begin{cases} +U_{feed}, & \text{when } U_{add}(\varphi, \alpha, t) > U_\Sigma(\varphi, \alpha, t) \\ 0, & \text{when } U_{add}(\varphi, \alpha, t) \leq U_\Sigma(\varphi, \alpha, t) \end{cases}$$

Voltage of the automatic gain control system, curve 32, and voltage of the additional channel, curve 33, is show in dB in FIG. 2, and $U_{com}(\varphi, \alpha, t)$—in volts. Time is shown on the abscissa axis.

Voltage $U_{com}(\varphi, \alpha, t)$ comes to switching device 18 as a control signal (control voltage).

FIG. 4 shows the operation of the radio direction-finder in the prototype mode and in the mode of the claimed method.

Operation of Prototype Mode

Conditions:
power supply to device 17 is switched off (microcircuit K140UD2A is disconnected);
relay R1 contacts are normally closed.

Operation Order is Shown in FIG. 4:
Up to time point $t_1$, the following condition is fulfilled:

$$U_\Sigma(\varphi,\alpha,t) \geq U_{add}(\varphi,\alpha,t)$$

a control signal at the input of switching device 18 is absent (line 41 in FIG. 4) and the direction-finder works in the prototype mode—in the design mode of automatic target tracking [1] (p. 69-71). The input of automatic gain control system 8 is connected through normally closed contacts of relay R1 (switching device 18) to the output of intermediate-frequency amplifier 6 of the sum channel whereby the signal normalization of the difference channel is carried out with the help of the sum one. The error signal from the output of phase detector 9 through error-signal amplifier 10 comes to drive mechanism 11 of the monopulse antenna which turns the antenna in such a way that its radar boresight coincide with the direction on target and the error signal value is maintained close to zero. As the inclination angle of the target signal polarization plane of the input signal reaches the orthogonal position the voltage amplitude of automatic gain control system 8 decreases (FIG. 4, curve 39) and after a certain value starts the avalanche-like increase of the error signal (FIG. 4, curve 42).

In time interval $t_1 < t < t_2$ the target signal polarization vector passes through the position close to the orthogonal position which is relative to the working polarization of antenna 1 (see FIG. 4, curve 38). In this case at the output of phase detector 9 abruptly increases the angle tracking error which leads to the loss of automatic angle tracking on target. The sum and difference channels change places, normalization condition is violated (See [1] Sections 7.3, 8.5). The automatic tracking loss occurs because during the impact of the signal on the orthogonal polarization on the monopulse direction-finder the voltage of the sum channel reaches in a certain small s-neighborhood of the radar boresight the values close to zero and, being in the denominator, turns the error signal into infinity.

The Claimed Method Operation.

Conditions:
power supply to device 17 is switched on (microcircuit K140UD2A is switched on);
contacts of switching device (relay R1) are normally closed.

Operation Procedure is Shown in FIG. 4:
During application of the claimed method the monopulse direction-finder operates in the prototype mode (in the design mode) up to time point $t_6$:

the following condition is met:

$$U_\Sigma(\varphi,\alpha,t) \geq U_{add}(\varphi,\alpha,t);$$

at the output of device 17 the control voltage is absent $U_{com}(\varphi, \alpha, t) = 0$.

the input of automatic gain control system 8 is connected through normally closed contacts of relay R1 (switching device 18) to the output of intermediate-frequency amplifier 6 of the sum channel whereby the signal normalization of the difference channel is carried out with the help of the sum one.

At interval $t_6 < t < t_7$:

$$U_\Sigma(\varphi,\alpha,t) < U_{add}(\varphi,\alpha,t),$$

at the output of device 17 the control voltage is generated $U_{com}(\varphi, \alpha, t)$.

under the influence of the control voltage from comparator 17 $U_{com}(\varphi, \alpha, t)$ switching device 18 is actuated: it disconnects the input of automatic gain control system 8 from the output of intermediate-frequency amplifier 6 of the sum channel and connects the input of automatic gain control system 8 to the output of intermediate-frequency amplifier 7 whereby the signal normalization of the sum channel is carried out with the help of the difference channel and the decision derived in [4] is realized.

In time interval $t_6 < t < t_7$ the loss of automatic angle tracking on target doesn't occur because at the time of the signal influence on cross polarization in time interval $t_6 < t < t_7$ due to application of devices 12-18 drive mechanism 11 carries out orientation of antenna 1 on target according to the direction-finding characteristic close to the direction-finding characteristic on the working polarization. In this case the voltage of the difference channel which can reach in a certain small ε-neighbourhood of the radar boresight sufficiently big values appears in the denominator, and the values of the sum channel close to zero moves to the numerator.

When the polarization plane passes the signal of the orthogonal position the voltage of the difference channel decreases due to the change of the directivity diagram, the amplification coefficient increases correspondingly (desensitization decreases) of the sum and difference channels respectively. During this process the amplitudes of the sum and additional channels are permanently compared. After passing point $t_7$:

the following condition is met:

$$U_\Sigma(\varphi,\alpha,t) \geq U_{add}(\varphi,\alpha,t);$$

at the output of device 17 the control voltage is absent $U_{com}(\varphi, \alpha, t) = 0$.

switching device 18 is actuated: it disconnects the input of automatic gain control system from the output of intermediate-frequency amplifier 7 of the difference channel and returns the connection of the input of automatic gain control system 8 to the output of intermediate-frequency amplifier 6 of the sum channel whereby the standard normalization of the difference channel signal is carried out with the help of the sum channel.

The circuit consisting of devices 12-17 can be characterized as a single-bit detector of the interference on the cross polarization, and device 18 connecting by the signal of the interference polarization detector the input of automatic gain control system 8 to the output of intermediate-frequency amplifier 6 of the sum channel or to the output of intermediate-frequency amplifier 7 of the difference channel as a protector of the monopulse direction-finder from the impact of cross-polarization signals and interferences.

Example 2

Figure 12:
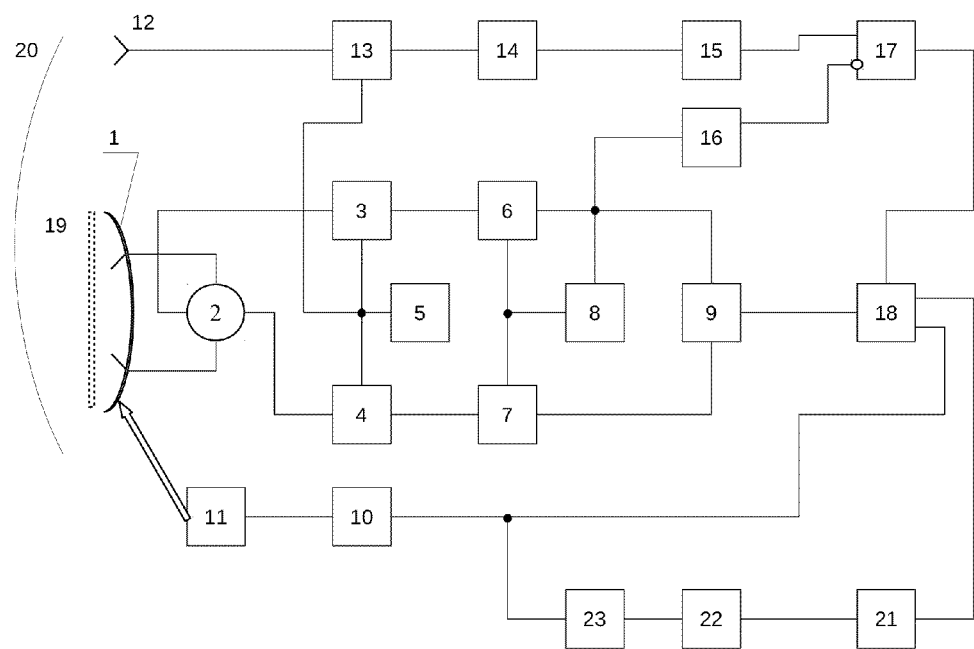
FIG. 12 depicts the second variant of the flow diagram of the sum-and-difference monopulse radio direction-finder with the components which realize the claimed method.

The radio direction-finder (FIG. 12) includes monopulse antenna 1 (for example, a paraboloid of revolution with two-mode feed) in the mouth of which polarization filter 19 is mounted. The working polarization for antenna 1 is a vertical one. The outputs of antenna 1 are connected to the sum-and-difference device in the form of stripline ring 2, the sum output of which is connected to mixer 3 and the difference output—to mixer 4. Mixers 3 and 4 are also connected to heterodyne 5 which is also connected to mixer 13. The signal input of mixer 13 is connected to the output of horn antenna 12 having the horizontal working polarization (orthogonal relative to the working polarization of monopulse antenna 1), which is mounted on the edge of antenna 1. The output of the mixer 13 is connected to the input of the intermediate-frequency amplifier of the additional channel 14. The outputs of mixers 3 and 4 are connected respectively to the inputs of intermediate-frequency amplifiers 6 and 7. The output of intermediate-frequency amplifier 6 is connected to the input of automatic gain control system 8 the output of which is connected to intermediate-frequency amplifiers 6 and 7. The outputs of intermediate-frequency amplifiers 6 and 7 are connected to phase detector 9, and the outputs of intermediate-frequency amplifiers 6 and 14 are connected through detectors 15 and 16 to the corresponding inputs of comparator 17 the output of which is connected to the control input of switching device 18. The output of phase detector 9 is connected to the signal input of switching device 18, one output of which is connected to drive mechanism 11 of antenna 1 through error-signal amplifier 10, the other output of the switching device through analog-to-digital converter 21, arithmetic unit 22, digital-to-analog converter 23 and error-signal amplifier 10 is also connected to drive mechanism 11 of antenna 1 located under radome 20 and having, for example, an ogival form.

Realization of Units 1-16, 19 is Described in [1] Chapters 2, 3, 7.

Figure 13:
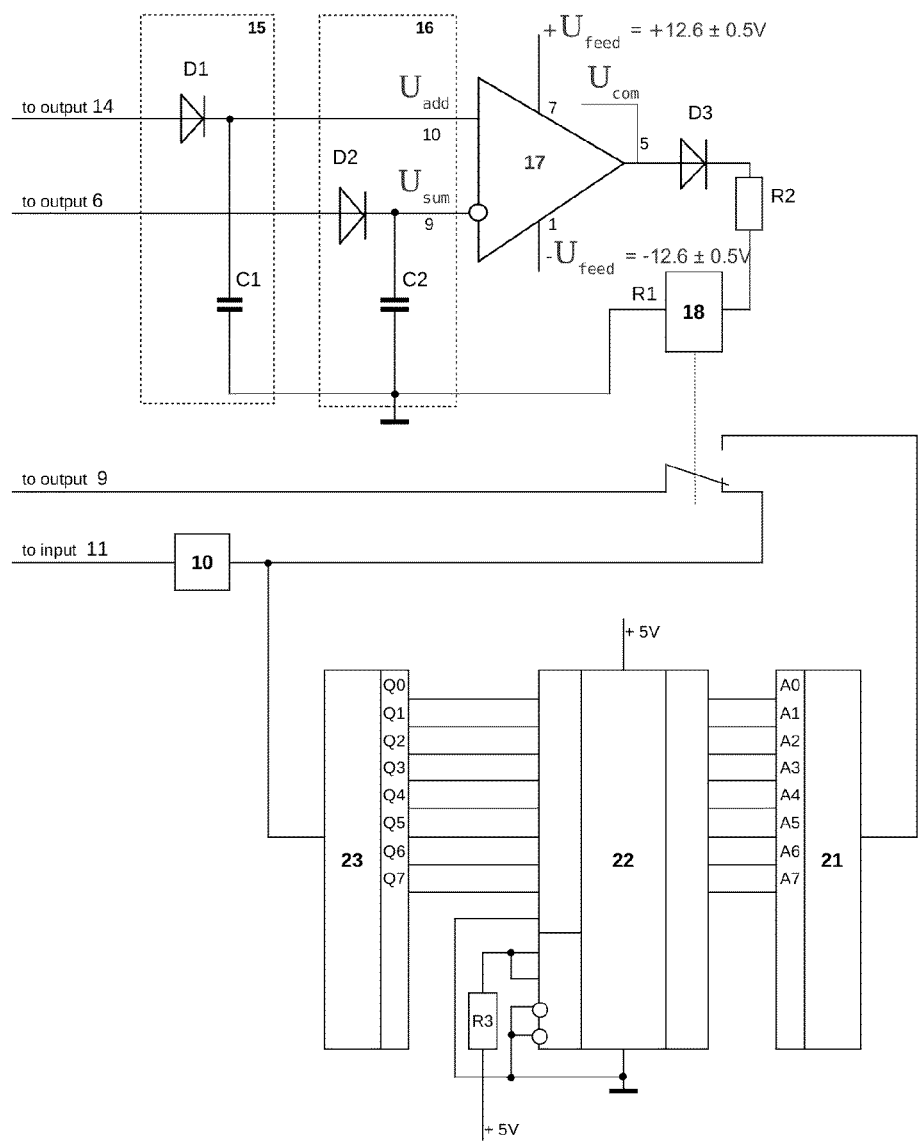
FIG. 13 depicts the diagram of the devices which realize operation of the claimed method according to the second variant.

Realization of devices 15, 16, 17, 18, 21, 22, 23 is shown in FIG. 13. Devices 15, 16, 17 and 18 are described above. As device 21 an eight-digits analog-to-digital converter on microcircuit K1107PV4A (TDC 1025J) with the range of input voltage [−2.5V . . . +2.5V] was used, programmable read-only memory KR556RT5 was used as arithmetic unit 22, as eight-digits digital-to-analog converter (device 23)—microcircuit 1118 PA1 (MS 10318).

A device realizing the claimed method operates in accordance with the following method.

Figure 3:
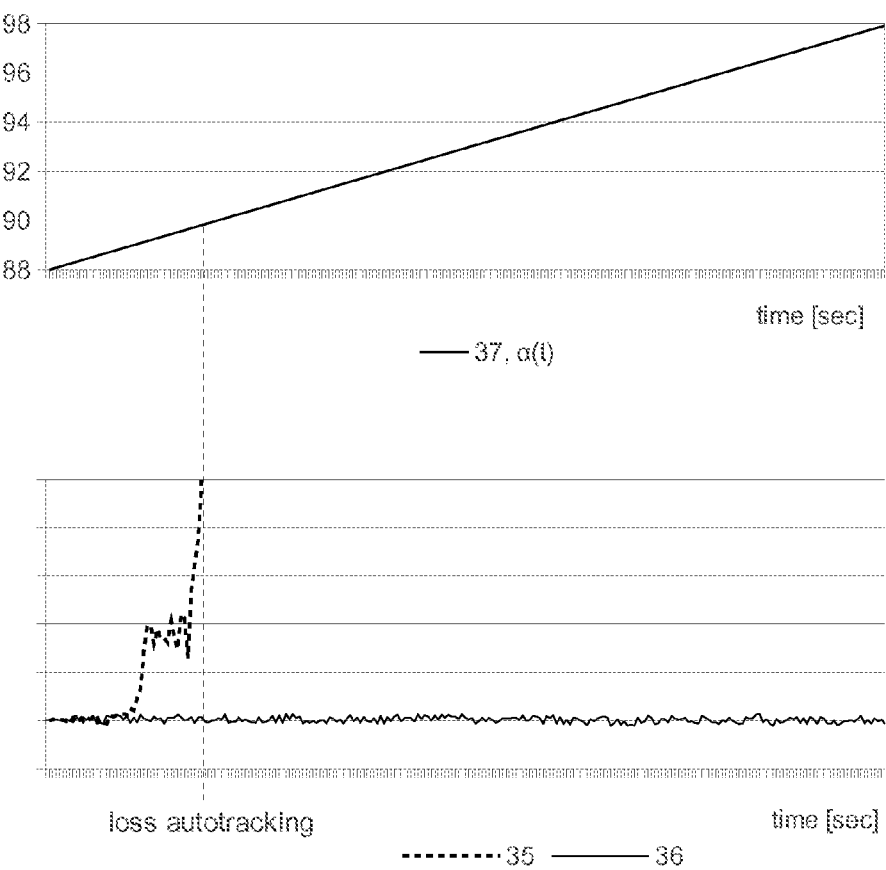
FIG. 3 shows time diagrams of the calculated functions of the error signal for the prototype and the suggested method during the ramp of the inclination angle of the signal polarization plane in the receiving basis of the monopulse antenna with a certain constant angular velocity.

Let radio direction-finder track the target, the signal polarization of which changes in time from the agreed polarization up to the orthogonal one in accordance with line 37 shown in FIG. 3, where $\alpha$ is the inclination angle of the target signal polarization vector relative to the vertical line—the ordinate of the diagram, time is laid along the abscissa axis. The real changes of the signal polarization can be caused by the polarization interference jamming or by the fluctuations of the signal reflected from the target. This signal after passing through radome 20 and polarization filter 19 is received by monopulse antenna 1 having the vertical working polarization. The polarization filter can be in the form of a set of thin conductors located in the monopulse antenna 1 mouth and oriented orthogonally to its working polarization which provide the reception of vertical polarization signals without attenuation and the reception of orthogonally polarized signals with certain attenuation. The signals from the outputs of monopulse antenna 1 come to the inputs of stripline ring 2 providing at its outputs the shaping of microwave signals of the sum and difference channels the signals of which come to mixers 3 and 4 respectively where they are transformed with the help of heterodyne 5 into the signals of intermediate frequency, which then are amplified in intermediate-frequency amplifiers 6 and 7 up to the required value and come to the inputs of phase detector 9. The difference signal amplitude determines the value of the angular error signal at the output of phase detector 9, the phase difference at the input of phase detector 9 between the signals of the sum and difference channels determines the sign of the angular error signal at the output of phase detector 9. Automatic gain control system 8 excludes the dependence of the angular error signal amplitude at the output of phase detector 9 on the level of the received signals by the connection of the input of automatic gain control system 8 to the output, of intermediate-frequency amplifier 6 of the sum channel, in this case the signal at the output of automatic gain control system 8 makes a simultaneous adjustment of the amplification coefficients of intermediate-frequency amplifiers 6 and 7 providing the signal normalization of the difference channel with the help of the sum one.

Simultaneously is carried out the reception of the signal component on the horizontal polarization by the additional channel of the direction-finder with the help of horn antenna 12, mixer 13 and intermediate-frequency amplifier 14.

Time dependences shown in FIGS. 2, 3 and 4 are the same. Expressions are also true for $U_{com}$—the voltage at the output of comparator 17.

a) Prior Art Operation (Prototype Mode)
Conditions:
power supply to device 17 is switched off (microcircuit K140UD2A show in FIG. 13 is switched off);
contacts of switching device 18 (relay R1 show in FIG. 13) are normally closed.
Operation Procedure is Shown in FIG. 4:
Up to time point $t_1$, the following condition is fulfilled:

$$U_\Sigma(\phi,\alpha,t) \le U_{add}(\phi,\alpha,t)$$

a control signal at the input of switching device 18 is absent (line 41 in FIG. 4) and the direction-finder works in the prototype mode—in the design mode of automatic target tracking ([1] p.p. 69-71). The error signal from the output of phase detector 9 through the normally closed contacts of switching device 18 comes to error-signal amplifier 10 and then to drive mechanism 11 of the monopulse antenna which turns antenna 1 in such a way that its radar boresight coincides with the direction on target and the error signal value is maintained close to zero. As the inclination angle of the target signal polarization plane of the input signal reaches the orthogonal position the voltage amplitude of automatic gain control system decreases and after a certain value starts the avalanche-like increase of the error signal.

In time interval $t_1 < t < t_2$ the target signal polarization vector passes through the position close to the orthogonal position which is relative to the working polarization of antenna 1 (see FIG. 3, curve 35). In this case at the output of phase detector 9 abruptly increases the angle tracking error which leads to the loss of automatic angle tracking on target. (See [1], Sections 7.3, 8.5).

b) Claimed Method Operation.
Conditions:
power supply to device 17 is switched on (microcircuit K140UD2A is switched on);
contacts of switching device 18 (relay R1 shown in FIG. 13) are normally closed.

Figure 10:
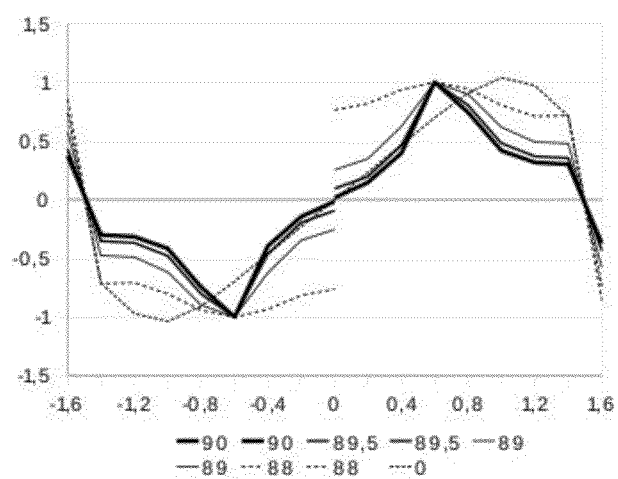
FIG. 10 depicts standardized inverse direction-finding characteristics for inclination angles of the polarization plane α=90; 89.5; 89; 88 degrees and the direction-finding characteristic on the working polarization at the zero inclination angle of the signal polarization plane α.

Operation Procedure is Shown in FIG. 4:

When the claimed method is used the loss of automatic angle tracking on target doesn't occur because at the time of the signal influence on cross polarization in time interval $t_6 < t < t_7$ due to application of devices 12-23 drive mechanism 11 carries out orientation of antenna 1 on target according to the direction-finding characteristic close to the direction-finding characteristic on the working polarization (See FIG. 10). It is achieved by the use of the control function $U_{contr}(t)$ calculated with the help of arithmetic unit 22 realized on the programmable read-only memory which carries out a table functional transformation of the error signal function $U_{co}(\phi, \alpha, t)$ having the following form:

$$U_m(\phi,\alpha,t) = U_{contr}(t) = [U_{co}(\phi,\alpha,t)]^{-1}$$

As it is seen from FIG. 4 (curve 43) the angular error value $U_m(\phi, \alpha, t)$ in time interval $t_6 < t < t_7$ doesn't exceed the value.

At time point $t_7$, when the target signal polarization vector finishes to pass through a hazardous position (FIG. 4, curve 38), the control voltage at the input of switching device 18 turns into zero (curve 41) and switching device 18 disconnects phase detector 9 from the circuit of device 21-23 and connects it directly to error-signal amplifier 10 and to drive mechanism 11 of antenna 1, the direction-finder returns to operation in the design mode of automatic tracking in which the error signal from the output of phase detector 9 is used to operate antenna 1 tracking the target.

The circuit consisting of devices 12-17 can be characterized as a single-bit detector of the interference on the cross polarization, and the circuit of devices 18, 21-23 as a protector of the monopulse radar from the impact of cross-polarization signals and interferences.

Application of the Invention Will Allow to:

Reduce the direction-finding error caused by the depolarization of the signals reflected from the target to a minimum.

Exclude losses of automatic angle tracking on target of the polarization interference jammer.

Increase target tracking accuracy of the polarization interference jammer in 8-10 times.

It should be mentioned that a positive effect is greater when the monopulse antenna is mounted under the blister.

A additional significant advantage of the method is the fact that its hardware implementation is based on cheap parabolic antennas and it doesn't require a great volume of additional equipment. When the claimed method is used it is unnecessary to mount on an aerial vehicle (including an unmanned aerial vehicle) expensive flat antenna arrays as monopulse antenna 1 which are used as the solution of the hazards of automatic angle tracking loss caused by the influence of the signals on cross polarization.

Some additional useful remarks and applications of the disclosed method and devices are described in details in [6].

CITED DOCUMENTS

[1] A. I. Leonov, K. I. Fomichev. Monopulse radiolocation. Moscow, Radio and communication, 1984.

[2] A. I. Leonov, K. I. Fomichev. Monopulse radar. Artech House, 1986.

[3] Van Brunt L. B. Applied ECM N.Y., 1978, v.1, E.W.Engineering. Part 4.

[4] E. Markin, On interference immunity of angle tracking systems under conditions of interference distorting location characteristic, Radar Conference, 2009 IEEE 4-8 May 2009 Pages: 1-6, Pasadena, USA, Digital Object Identifier 10.1109/RADAR.2009.4977092.

[5] E. Markin, Jamming detection in providing for radar jamming immunity. EUROCON'09 IEEE, May 18-23, 2009, Pages: 1565-1567, Saint Petersburg, Russia, Digital Identifier Object 10.1109/EUROCON. 2009.5167849.

[6] E. Markin, Method of automatic target angle tracking by sum-and-difference monopulse radar invariant against the polarization jamming. European Radar Conference (EuRAD), pp. 499-502, Paris, France, 2010.

I claim:

1. A method of automatic target angle tracking by monopulse radar under conditions of interference distorting location characteristic, said method comprising at least the following steps:

the reception of the signals from the target is carried out by a monopulse antenna by using sum and difference channels and the monopulse antenna has a vertical working polarization;

the difference signal amplitude and the phase difference between the signals of the sum and difference channels are measured, herewith the difference signal amplitude determines a value of an angular error signal, and the phase difference between the signals of the sum and difference channels determines a sign of the angular error signal;

the monopulse antenna is orientated in the direction of the target relying on the measured values of the amplitude and the phase difference signals corresponding to an angular error value and its sign;

an additional reception of signal component from the target on the polarization orthogonal or is close to orthogonal relative to the working polarization of said monopulse antenna, is performed;

the amplitude values of the additional and sum signals are compared;

when the amplitude value of the additional channel signal exceeds the amplitude value of the sum signal, the monopulse antenna is oriented relying on the angular error, the sign of which corresponds to the measured value of the phase difference between the sum and difference signals, the value is formed via the inverse transformation of the measured amplitude value of the difference signal.

2. A monopulse radar for target autotracking comprises a monopulse antenna having a vertical working polarization;

the outputs of said monopulse antenna are connected to the appropriate inputs of a stripline ring providing at its outputs the shaping of microwave signals of the sum and difference channels;

the sum output of said stripline ring is connected to a mixer of the sum channel and the difference output of said stripline ring is connected to a mixer of the difference channel;

said mixers of the sum and difference channels are connected to a heterodyne which is also connected to a mixer of an additional channel;

the signal input of said mixer of the additional channel is connected to a horn antenna having a working polarization is orthogonal or close to orthogonal relative to the working polarization of said monopulse antenna;

the outputs of said mixers of the sum, difference and additional channels are connected to the inputs of intermediate-frequency amplifiers of the sum, difference and additional channels respectively;

the outputs of said intermediate-frequency amplifiers of the sum and difference channels are connected to the appropriate inputs of a phase detector on the output of which is formed an error signal;

the output of said phase detector through error-signal amplifier is connected to a drive mechanism of said monopulse antenna;

the outputs of said intermediate-frequency amplifiers of the sum and additional channels are connected through detectors of the sum and additional channels to the appropriate inputs of a comparator on the output of which is formed a control signal;

the output of said comparator is connected to a switching device (switch), the driving point of said switch, also called the control input of the switch, receives the control signal from the comparator;

the outputs of said intermediate-frequency amplifiers of the sum and difference channels are also connected to the appropriate inputs of said switch the output of the switch is connected to the input of an automatic gain control system;

the output of said automatic gain control system is connected to said intermediate-frequency amplifiers of the sum and difference channels.

3. A monopulse radar for target autotracking comprises a monopulse antenna having a vertical working polarization;

the outputs of said monopulse antenna are connected to the inputs of a stripline ring providing at its outputs the shaping of microwave signals of the sum and difference channels;

the sum output of said stripline ring is connected to a mixer of the sum channel and the difference output of said stripline ring is connected to a mixer of the difference channel;

said mixers of the sum and difference channels are connected to a heterodyne which is also connected to a mixer of an additional channel;

the signal input of said mixer of the additional channel is connected to a horn antenna having a working polarization is orthogonal or close to orthogonal relative to the working polarization of said monopulse antenna;

the outputs of said mixers of the sum, difference and additional channels are connected to the inputs of intermediate-frequency amplifiers of the sum, difference and additional channels respectively;

the output of the intermediate-frequency amplifier of the sum channel is connected to the input of an automatic gain control system;

the output of said automatic gain control system is connected to said intermediate-frequency amplifiers of the sum and difference channels;

the outputs of said intermediate-frequency amplifiers of the sum and difference channels are connected to a phase detector on the output of which is formed an error signal;

the outputs of said intermediate-frequency amplifiers of the sum and additional channels are connected through detectors of the sum and additional channels to the corresponding inputs of a comparator on the output of which is formed a control signal;

the output of said comparator is connected to a switching device (switch), the control input of said switch, also called the driving point of the switch, receives the control signal from the comparator;

the output of the phase detector is connected to the signal input of said switch;

one output of said switch is connected to a drive mechanism of said monopulse antenna through an error-signal amplifier;

the other output of said switch is connected to the input of an analog-to-digital converter the output of which is connected through an arithmetic unit to the input of a digital-to-analog converter;

the output of said digital-to-analog converter is connected through said error-signal amplifier to said drive mechanism of said monopulse antenna.

4. The device as recited in claims 2, 3 where said monopulse antenna is located under a radome.

5. The device as recited in claims 2, 3 where said monopulse antenna has a polarization filter.

6. The device as recited in claims 2, 3 where said monopulse antenna has a polarization filter of an ogival form.

7. The device as recited in claims 2, 3 where said horn antenna is mounted on the edge of said monopulse antenna.

\* \* \* \* \*